United States Patent [19]

Larsson

[11] 4,035,041
[45] July 12, 1977

[54] HYDRAULICALLY SUPPORTED THRUST BEARING

[75] Inventor: Birger Larsson, Finspong, Sweden

[73] Assignee: Stal-Laval Turbin AB, Finspong, Sweden

[21] Appl. No.: 661,281

[22] Filed: Feb. 25, 1976

Related U.S. Application Data

[63] Continuation of Ser. No. 491,838, July 25, 1974, abandoned.

[30] Foreign Application Priority Data

Aug. 1, 1973 Sweden .............................. 7310582

[51] Int. Cl.² .................................... F16C 17/04
[52] U.S. Cl. ................................ 308/135; 308/9; 308/160
[58] Field of Search ............... 308/36, 59, 160, 121, 308/135, 163, 176, 164

[56] References Cited

U.S. PATENT DOCUMENTS

| 2,986,431 | 5/1961 | Block et al. | 308/160 |
| 3,212,829 | 10/1965 | Gross | 308/121 |

Primary Examiner—Joseph F. Peters, Jr.
Assistant Examiner—Richard A. Bertsch
Attorney, Agent, or Firm—Eric Y. Munson

[57] ABSTRACT

An improved thrust bearing of the double acting type has separate tiltably mounted bearing blocks arranged in plane ring segments on each side of a bearing box. The separate bearing blocks are movably supported on hydraulic pistons which are axially movable in corresponding hydraulic cylinders. The hydraulic cylinders on each side of the bearing box are connected by hydraulic pressure transmitting channels individually to separate hydraulic pressure sources so that each bearing block ring segment will have its own pressure while the bearing blocks within each segment will have the same load.

3 Claims, 3 Drawing Figures

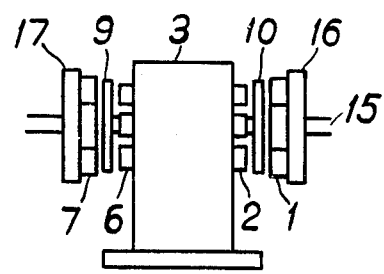
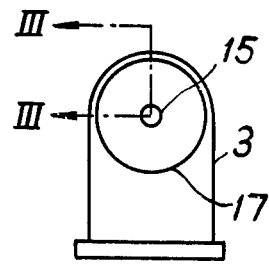
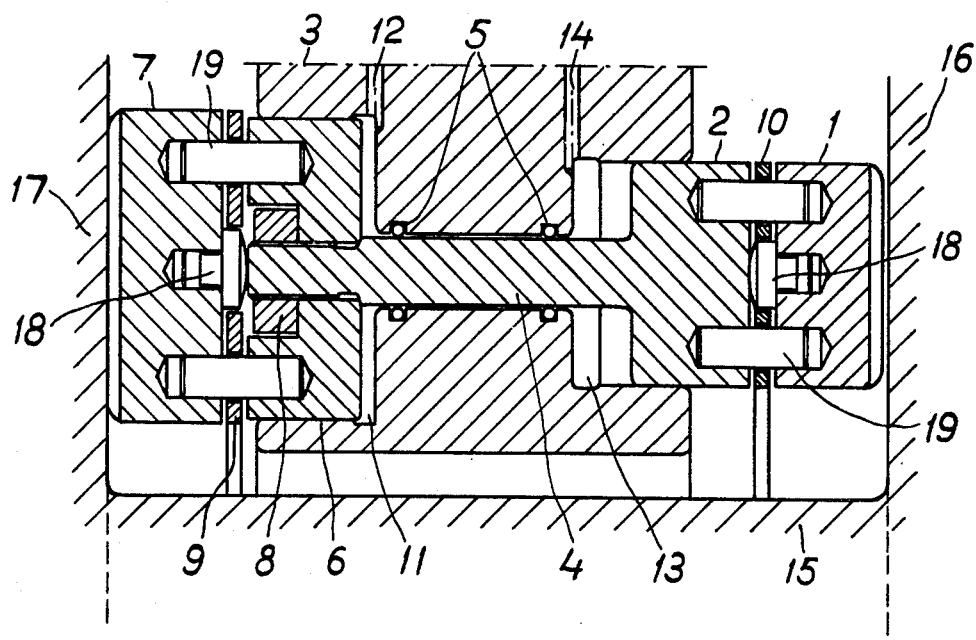

HYDRAULICALLY SUPPORTED THRUST BEARING

This application is a continuation of my co-pending application Ser. No. 491,838, filed July 25, 1974 now abandoned.

BACKGROUND OF THE INVENTION

This invention relates to the thrust bearings of the type wherein separate bearing blocks or pads are each movably supported within a supporting member. The movable support for each bearing block usually consists of an arched pivot or knob in the center of the block enabling it to tilt under the influence of the pressure in an oil film between the bearing block and the opposite bearing surface. Sliding pivots prevent the bearing block from rotating about the pivot or knob. Such thrust bearings are commonly referred to as tilting-pad thrust bearings or bearings of the Michell type.

In order to obtain an even distribution in loads carried by the various bearing blocks, it is desirable to support the blocks in a manner so that they present the same height to the bearing surface. This is difficult to achieve to a satisfactory degree, especially in those applications where high demands are placed on the bearing such as in large turbines and large machines. One attempt at providing effective distribution of loads on such a bearing is described in U.S. Pat. No. 2,986,431.

In addition to obtaining distribution of the load on the bearing, it is also frequently desired to direct the bearing pressure in one direction or the other and to be able to axially displace a shaft, as, for example, for controlling a disconnectable clutch.

SUMMARY OF THE INVENTION

The present invention provides a double acting thrust bearing with which axial displacement is obtainable while at the same time yielding even distribution of load between the different bearing blocks of each acting member of the double acting bearing. Thus, according to the present invention, there is also provided a bearing which enables distributing the total load of a heavy thrust load over several thrust bearings arranged consecutively in the axial direction to achieve even distribution of the load over the bearings and bearing blocks independent of any thermal movements in the shaft and/or the bearing support bed.

In the double acting thrust bearing according to this invention, a plurality of separate bearing blocks are arranged as a plane ring in support segments on each side of a bearing box with each separate bearing block being movably supported on a hydraulic piston movably axially in a corresponding hydraulic cylinder formed in the box. The hydraulic cylinders each side of the bearing box are interconnected by hydraulic pressure transmitting channels to form a pressure chamber for that side. The respective chambers for each side of the double acting bearing are independent and individually connected to separate hydraulic pressure sources so that each chamber may possess variable pressure levels dependent upon the direction of the bearing pressure on the bearing acting for that side.

The hydraulic pressure sources for each side may be controlled in relation to each other so that the bearing pressure can be exerted in one or the other of the axial directions in response to external axial force on the bearing shaft. Thus, a double acting bearing according to the present invention may displace the shaft positively in one or the other direction such as, for example, for controlling a disconnectable clutch. The hydraulic pistons of one support on one side of the bearing box may be connected to corresponding hydraulic pistons and the support on the other side of the bearing box by piston rod means.

Therefore, a feature of this invention is the provision of a double acting thrust bearing enabling directing of the bearing pressure to displace the shaft in one or the other direction while providing effective distribution of the bearing load on the individual bearing blocks within each acting bearing member of the bearing.

The foregoing features, advantages and objects of the present invention, as well as others, will be more apparent from the following description of an embodiment thereof taken in connection with the accompanying drawings in which:

BRIEF DESCRIPTION OF THE DRAWINGS

FIG. 1 is a side elevational view of an embodiment of a double acting thrust bearing according to the invention;

FIG. 2 is an end elevational view, in the axial direction, of the double acting thrust shown in FIG. 1;

FIG. 3 is a sectional view, taken along the line III—III of FIG. 2 showing details of the bearing box and cylinders of the embodiment of a double acting thrust bearing according to the invention;

FIG. 4 is an enlarged elevational view, partly in section, showing details of the bearing block pressure chambers being individually connected to separate hydraulic sources and the sources being controllable in relation to one another; and FIG. 5 is a sectional view, taken along the line V—V of FIG. 4 showing the pressure interconnections between the bearing block cylinders.

DESCRIPTION OF THE PREFERRED EMBODIMENT

FIGS. 1 and 2 show a double acting thrust bearing of the so called Michell type improved according to the present invention. The bearing rotating portion is represented by the shaft 15 having cams 16 and 17. The bearing stationary portion comprises the bearing box 3 forming an annular element which surrounds the shaft and which is fastened in the machine bed. For each side, that is each acting member, of the bearing, the bearing box 3 supports a plurality of bearing blocks designated 1 and 7, respectively, which are supported as plane ring segments. Each of the two groups of bearing blocks forms a plane ring which makes contact with the bearing side of the corresponding cams 16 and 17 respectively.

Referring to FIGS. 3 and 4, it can be seen that each bearing block is provided with an arched knob or pivot 18 which rests against its respective hydraulic piston, with block 1 resting against piston 2 and block 7 resting against piston 6. The hydraulic pistons 2 and 6 are movable in corresponding hydraulic cylinders within the stationary bearing box 3. These cylinders form pressure chambers 13 and 11, respectively, behind the pistons. All pressure chambers 13 are mutually connected by connector channel 22 and connected to a source of hydraulic pressure, such as a pressure vessel or, as shown, an oil pump 24 through the channel 14. Similarly, the pressure chambers 11 are mutually connected through the connecting channel 20 and through the channel 12 to the hydraulic pressure source 26. In this way, the bearing blocks 1 will all have the same load while the bearing blocks 7 will also have the same load although the blocks 1 and 7 will be independent of one another. The interconnection of the pressure chambers is seen, for the pressure chambers 11, in FIG. 5 and is the same for the pressure chamber 13 were a view to be taken through the chambers 13.

The pressures in the chambers 11 and 13 can be changed in relation to each other by means of control of the pressure sources 24 and 26 through known control means indicated by the block representation 21 having remote control signal lines 23. By changing the pressure in the chambers 11 and 13 in relation to each other, bearing pressure can be exerted on one or the other axial directions corresponding to the external axial force on the shaft 15. In a similar manner, it is possible to displace the shaft 15 in one or the other direction in the double acting bearing as shown. This is particularly advantageous for controlling a disconnectable clutch.

The corresponding pistons 1 and 7 from the two sides of the bearing box 3 may be connected by means of a piston rod 4 and a nut 8, FIG. 3. This results in improved guiding of the pistons which as a consequence can be designed with smaller dimensions. A permanent clearance is also obtained in the unloaded bearing. The chambers 11 and 13 are separated from each other and communication therebetween is prevented by means of the washers 5 positioned around the piston rod 4.

In order to prevent the bearing blocks and pistons from rotating about their respective axes, they are guided by pivots 19 connecting each bearing block with the corresponding piston. These pivots 19 are guided in turn for each bearing by means of plane rings 10 and 9, respectively, which have holes drilled to accept them. The rings 9 and 10 may be divided into segments, if desired, connecting at least two bearing blocks which then maintain each other in position.

The pressure medium to the chambers 11 and 13 may be supplied from hydraulic pumps 26 and 24 shown or from a pressure vessel and may utilize the same oil as is used to lubricate the bearing in which case the oil leaking out from the chambers 11 and 13 may be permitted to mix with the lubricating oil.

An advantage of the bearing of this invention having effective equalization of the load is that the application of a high nominal load on the bearing is permitted. This finds particular utility when several thrust bearings of the type described are coupled one after the other to accommodate great axial forces of great magnitude.

I claim:

1. In a thrust bearing having separate tiltably mounted bearing blocks annularly arranged surrounding the bearing axis and movably supported in a direction axial to the blocks, the improvement of a double acting thrust bearing enabling directing of the bearing pressure to displace a shaft in one or the other direction comprising a bearing box for positioning about a shaft, two groups of a plurality of separate bearing blocks arranged in plane ring segments on each side of the box for serving as a double acting bearing, each separate bearing block being movably supported on a hydraulic piston movable axially in a corresponding hydraulic cylinder formed in the corresponding side of the bearing box, the plurality of hydraulic cylinders on one side of the bearing box being interconnected by hydraulic pressure transmitting channels to form a pressure chamber in the corresponding side of the bearing box, the respective pressure chambers each being individually connected to a separate hydraulic pressure source so that each pressure chamber may possess variable pressure levels dependent upon the direction of the bearing pressure, the hydraulic pistons of one side of the bearing box being connected to the corresponding hydraulic pistons of the other side by a piston rod means slidably accommodated in bores in the bearing box and sealing means preventing fluid communication between the opposite pressure chambers.

2. An improved thrust bearing as claimed in claim 1 wherein the separate hydraulic pressure sources are controllable in relation to one another to change the pressure in the pressure chambers on respective sides in relation to each other.

3. An improved thrust bearing as claimed in claim 1, in which each bearing block is additionally connected to its corresponding piston by pivot means fitted in and extending between aligned recesses in the bearing blocks and the pistons so as to prevent rotation about their respective axes.

* * * * *